(12) United States Patent
Buchegger

(10) Patent No.: US 8,307,501 B2
(45) Date of Patent: *Nov. 13, 2012

(54) SPRING HINGE BETWEEN A BOW AND A BOW CHEEK OF A PAIR OF SPECTACLES

(75) Inventor: Harald Buchegger, Scharnstein (AT)

(73) Assignee: Redtenbacher Präzisionsteile GmbH, Scharnstein (AT)

( * ) Notice: Subject to any disclaimer, the term of this patent is extended or adjusted under 35 U.S.C. 154(b) by 414 days.

This patent is subject to a terminal disclaimer.

(21) Appl. No.: 12/451,858

(22) PCT Filed: Apr. 29, 2009

(86) PCT No.: PCT/AT2009/000175
§ 371 (c)(1),
(2), (4) Date: Dec. 3, 2009

(87) PCT Pub. No.: WO2009/132370
PCT Pub. Date: Nov. 5, 2009

(65) Prior Publication Data
US 2010/0101049 A1 Apr. 29, 2010

(30) Foreign Application Priority Data
May 2, 2008 (AT) .................................. A 690/2008

(51) Int. Cl.
*G02C 5/22* (2006.01)
(52) U.S. Cl. .......................................... 16/228; 351/153
(58) Field of Classification Search .................... 16/228; 351/153, 113, 114, 111, 140, 158, 119, 41
See application file for complete search history.

(56) References Cited

U.S. PATENT DOCUMENTS 4,428,094 A * 1/1984 Emain ............................. 16/228
(Continued)

FOREIGN PATENT DOCUMENTS

AT 502 196 2/2007
(Continued)

OTHER PUBLICATIONS

International Search Report.

*Primary Examiner* — Jeffrey O Brien
(74) *Attorney, Agent, or Firm* — Collard & Roe, P.C.

(57) ABSTRACT

A spring hinge between a bow (2) and a bow cheek (1) of a pair of spectacles is described, having a cheek-side hinge part (3), which forms a bearing fork (6), having a bow-side hinge part (4), which is mounted so it is rotatable in the bearing fork (6) by a hinge axis (5), and having a U-shaped sliding part (9), which supports the bow-side hinge part (4), and which is guided so it is displaceable in a recess (10) of a bow-side housing (11) in the bow longitudinal direction and receives a coiled spring (15) between its two legs (14), which is supported on one side on a web (16), which connects the two legs (14) of the U-shaped sliding part (9), and on the other side on a buttress (17), which engages through a through opening (19), which runs coaxially to the coiled spring (15), in the bow-side hinge part (4) in a nut thread (18) of the housing (11), which is coaxial to the coiled spring (15). In order to allow a largely concealed hinge configuration, it is proposed that the cheek-side hinge part (4) forms an insert, which is inserted into a laterally closed receptacle pocket (7) of the bow cheek (1), and the bow cheek (1) having the insert exposes a passage for the buttress (17), which is coaxial to the coiled spring (15), in the angled bow position.

3 Claims, 2 Drawing Sheets

U.S. PATENT DOCUMENTS

| | | | |
|---|---|---|---|
| 4,991,258 A | 2/1991 | Drlik | |
| 6,163,926 A * | 12/2000 | Watanabe | 16/228 |
| 6,814,438 B2 | 11/2004 | Desbiez-Piat | |
| 7,434,295 B2 * | 10/2008 | Niu | 16/228 |
| 7,484,844 B2 * | 2/2009 | Spandl | 351/153 |
| 7,735,193 B2 | 6/2010 | Buchegger | |
| 7,938,534 B2 * | 5/2011 | Sprickler | 351/153 |
| 7,946,704 B2 * | 5/2011 | Buchegger | 351/153 |
| 2006/0213031 A1 * | 9/2006 | Niu | 16/228 |
| 2007/0169309 A1 | 7/2007 | Buchegger | |
| 2007/0192991 A1 | 8/2007 | Buchegger | |
| 2010/0162525 A1 * | 7/2010 | Wienicke et al. | 16/228 |

FOREIGN PATENT DOCUMENTS

| | | |
|---|---|---|
| EP | 345145 A1 * | 12/1989 |
| EP | 1 059 552 | 12/2000 |
| EP | 1 821 132 | 8/2007 |
| FR | 2 275 791 | 1/1976 |
| WO | WO 9428454 A1 * | 12/1994 |
| WO | WO 01/31386 | 5/2001 |
| WO | WO 2005/111699 | 11/2005 |
| WO | WO 2006/053983 | 5/2006 |
| WO | WO 2008/087050 | 7/2008 |

* cited by examiner

SPRING HINGE BETWEEN A BOW AND A BOW CHEEK OF A PAIR OF SPECTACLES

CROSS REFERENCE TO RELATED APPLICATIONS

This application is the National Stage of PCT/AT2009/000175 filed on Apr. 29, 2009, which claims priority under 35 U.S.C. §119 of Austrian Application No. A 690/2008 filed on May 2, 2008. The international application under PCT article 21(2) was not published in English.

FIELD OF THE INVENTION

The invention relates to a spring hinge between a bow and a bow cheek of a pair of spectacles having a cheek-side hinge part which forms a bearing fork, having a bow-side hinge part which is mounted so it is rotatable in the bearing fork by a hinge axle, and having a U-shaped sliding part, which supports the bow-side hinge part, and which is guided so it is displaceable in the bow longitudinal direction in a recess of a bow-side housing and receives a coiled spring between its two legs, which is supported on one side on a web which connects the two legs of the U-shaped sliding part, and is supported on the other side on a buttress, which engages in a nut thread of the housing, which is coaxial to the coiled spring, through a through opening in the bow-side hinge part which runs coaxially to the coiled spring.

DESCRIPTION OF THE PRIOR ART

In order to situate a spring hinge, whose hinge parts are typically situated on the inner side of the bow cheek and the bow of a pair of spectacles, in a concealed manner, inserting the cheek-side hinge part which forms a bearing fork into a receptacle pocket of the bow cheek and also implementing a housing, which receives the bow-side, spring-loaded hinge part so it is displaceable, as an insert enclosed by the bow is known in plastic spectacles (WO 2006/053983 A1), so that the hinge parts essentially protrude only beyond the front faces of the bow cheek and/or the bow and are not recognizable when the bow is opened, because the front faces of the bow cheek and the bow are pressed flatly against one another by the spring hinge. Only a recess on the cheek inner side, which is required for the pivoting of the bow-side hinge part, remains. However, it is disadvantageous that the hinge axle must be inserted through a through opening in the bow cheek, which not only causes assembly difficulties, but rather also permits the inserted hinge axle to be externally recognized.

In addition, to ensure simple assembly conditions, providing the bow-side hinge part with a U-shaped sliding part which engages in a housing recess is known in spring hinges (AT 502 196 B1), the sliding part receiving a coiled spring between its two legs, which is supported on one side on the web connecting the two legs of the sliding part and on the other side on a buttress, which is screwed into a nut thread of the housing coaxial to the coiled spring, through a coaxial through opening of the bow-side hinge part. Such a design represents an advantageous condition for a housing closed in the peripheral direction, which can be inserted in a spectacle bow without difficulties from the front side. However, for the concealed insertion of such a known spring hinge, the difficulties occurring in the area of the bow cheek remained unsolved.

SUMMARY OF THE INVENTION

The invention is thus based on the object of implementing a spring hinge between a bow and a bow cheek of the type described at the beginning so that a concealed configuration in the cheek area is possible, without the bow cheek having to be provided with a through opening for the hinge axle.

The invention achieves the stated object in that the cheek-side hinge part forms an insert which is inserted into a laterally closed receptacle pocket of the bow cheek, and the bow cheek having the insert exposes a passage for the buttress, which is coaxial to the coiled spring, in the angled bow position.

Because of the laterally closed receptacle pocket of the bow cheek, the hinge axle is only held in the bearing fork of the cheek-side hinge part, so that through openings in the bow cheek for inserting the hinge axle are dispensed with. However, this makes the subsequent insertion of the bow-side hinge part, which is already articulated with the cheek-side hinge part, into the bow-side housing necessary. The screwing of the 3 housing-side buttress for the spring hinge coaxially to the coiled spring of the spring hinge through a corresponding through opening in the bow-side hinge part offers an advantageous requirement for this purpose. However, an access capability to the through opening must be provided in the bow-side hinge part, in that the bow cheek, having the insert forming the bearing fork and the hinge axle, exposes a passage for the buttress, which is coaxial to the coiled spring, in the angled bow position. Therefore, for assembly, the bow-side hinge part which is already linked to the bow cheek is to be pushed into the housing embedded in the bow having the coiled spring in the angle for the folded-in bow and is to be secured with the buttress, which is screwed through the through opening in the bow-side hinge part into the nut thread of the housing, whereby the assembly is completed.

In order that the hinge axle does not obstruct the coaxial passage of the buttress to the through opening in the bow-side hinge part, without having to be offset correspondingly relative to the coiled spring axis, the hinge axle can be recessed in the area of the passage for the buttress. This weakening of the hinge axle does not play a role, because the entire cross-section of the hinge axle is available in the connection area of the two hinge parts. Another possibility for allowing the free passage of the buttress to the through opening in the bow-side hinge part comprises forming the hinge axle from two axle stubs, which are held at an axial distance from one another by the buttress. This embodiment variant additionally allows subsequent disassembly of the hinge, because after the detachment of the buttress, the axle stubs may be removed one after another from the receptacle holes in the two hinge parts.

BRIEF DESCRIPTION OF THE DRAWING

The object of the invention is shown for exemplary purposes in the drawing. In the figures.

BRIEF DESCRIPTION OF THE DRAWING

Figure 1:
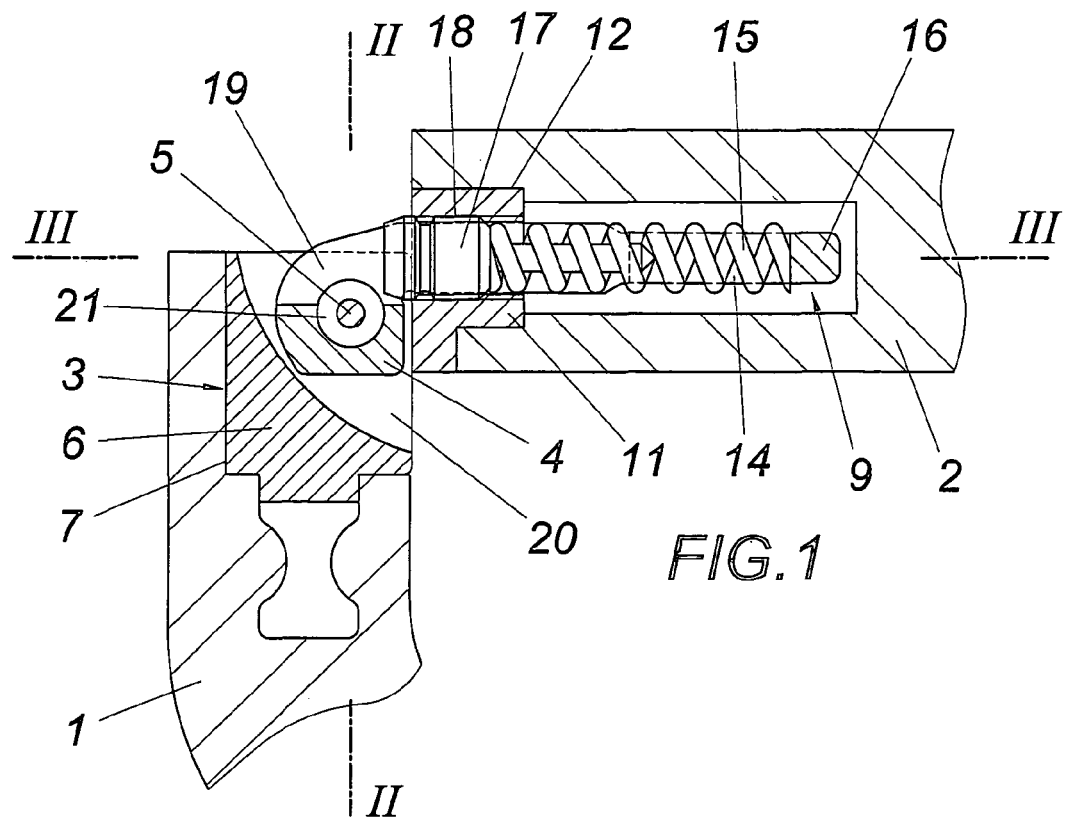
FIG. 1 shows a spring hinge according to the invention between a bow and a bow cheek of a pair of spectacles with angled bow in a longitudinal section.
Figure 2:
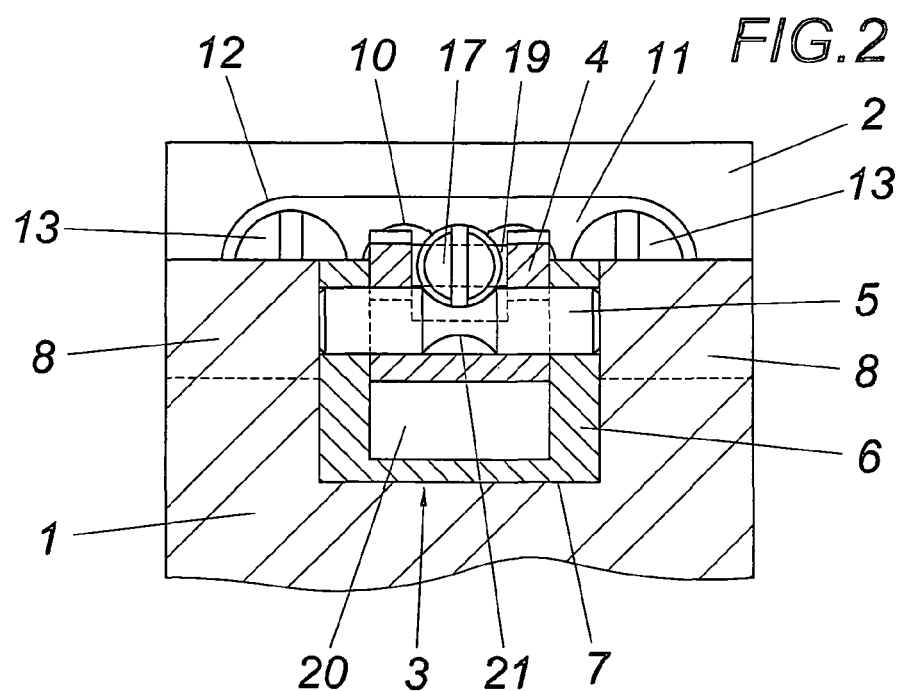
FIG. 2 shows this spring hinge in a section along line II-II of FIG. 1.
Figure 3:
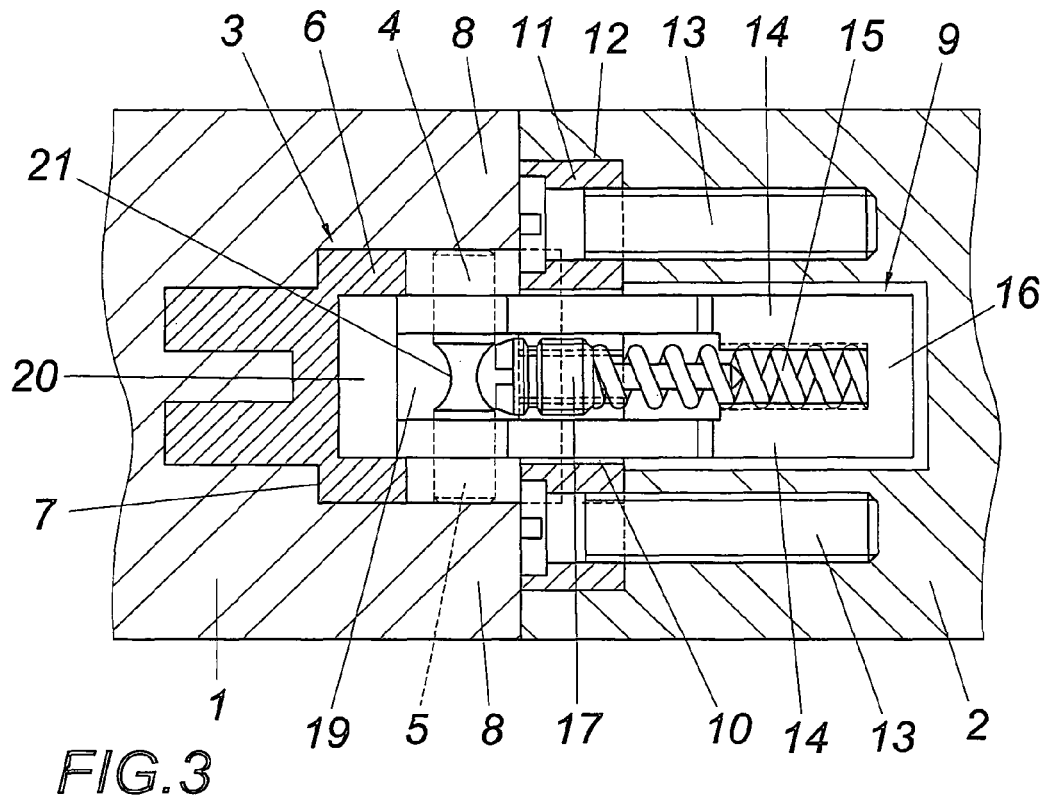
FIG. 3 shows a section along line III-III of FIG. 1, but with stretched bow.

The spring hinge according to FIGS. 1 through 3 has two hinge parts 3 and 4, associated on one hand with a bow cheek 1 and on the other hand with a bow 2 of a pair of spectacles, which are connected to one another so they are pivotable with the aid of a hinge axle 5. The hinge part 3 forms an insert in the form of a bearing fork 6, which is inserted into a receptacle pocket 7 having closed side walls 8.

The bow-side hinge part 4 forms a U-shaped sliding part 9, which is guided so it is displaceable in a recess 10 of a housing 11 in the bow longitudinal direction. This housing 11 is inserted into a frontal bow recess 12 and fixed using fastening screws 13. A coiled spring 15 is provided between the legs 14 of the sliding part 9, which is supported on one side on the web 16 connecting the two legs 14 to one another and on the other side on a buttress 17, which is screwed into a nut thread 18 of the housing 11, which is coaxial to the screw axis, through a through opening 19 of the hinge part 4 running coaxially to the coiled spring 15, as can be inferred from FIG. 1 in particular.

To assemble the spring hinge, firstly the hinge part 4 is to be inserted into the bearing fork 6 of the hinge part 3 and secured with the aid of the hinge axis 5, which does not protrude beyond the bearing fork 6, so that the hinge part 3 having the linked hinge part 4 can be positively inserted into the receptacle pocket 7 of the bow cheek 1. The hinge part 4 having the coiled spring 15 inserted between the legs 14 can then be pushed into the housing 11, which is fastened to the front side of the bow 2, in order to be secured with the aid of the buttress 17 relative to the housing 11. For this purpose, the hinge part 4 is to be held in an angle for the folded-in bow 2, as can be inferred from FIGS. 1 and 2. In this position, the bow cheek 1 having the insert formed by the bearing fork 6 forms a passage, which is coaxial to the coiled spring 15, for screwing the buttress 17 into the nut thread 18 of the housing 11 through the through opening 19 of the hinge part 4. The assembly is completed by screwing the buttress 17 into the housing 11. The bow cheek 1 is therefore elastically drawn via the coiled spring 15 against the front side of the bow 2, which ensures planar contact of the bow cheek 1 against the front face of the bow 2 without play. The spring hinge is not externally recognizable in the stretched location of the bow 2 shown in FIG. 3. Only the fork opening 20 required for the pivot movement of the hinge part 4 remains on the bow inner side.

As can be inferred from FIG. 2 in particular, with only a slight offset of the hinge axis 5 relative to the axis of the coiled spring 15, the unobstructed insertion of the buttress 17 is only made possible if the hinge axis 5 forms a recess 21 for the passage of the buttress 17.

Figure 4:
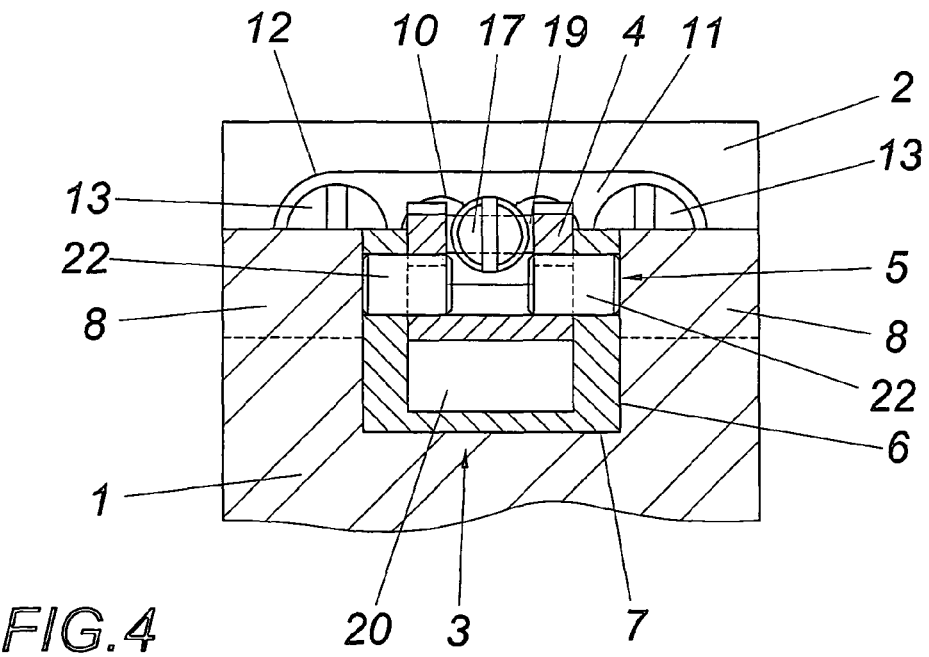
FIG. 4 shows an illustration, corresponding to FIG. 2, of a construction variant of a spring hinge according to the invention.

FIG. 4 differs from the embodiment according to FIGS. 1 through 3 solely through the implementation of the hinge axle 5 in connection with the buttress 17. Specifically, the hinge axle 5 is composed according to FIG. 4 from two axle stubs 22, which are held at a mutual distance from one another by the head of the buttress 17, which is lengthened for this purpose and therefore protrudes in the area of the hinge axle 5. This embodiment of the hinge axle 5 allows the subsequent insertion of the hinge part 4 into the bearing fork 6, which is already anchored in the bow cheek 1, because the axle stubs 22 may be inserted one after another through the through opening 19 of the hinge part 4 and then pushed in the axial direction into the bearing holes. However, this also means that the hinge part 4 can also subsequently be removed from the bearing fork 6, after removal of the buttress 17, if the axle stubs 22 are first displaced axially in the area of the through opening 19 and then removed from the through opening 19 transversely to their axis.

The invention claimed is:

1. A spring hinge between a bow and a bow cheek of a pair of spectacles having:
   a cheek-side hinge part forming a bearing fork,
   a bow-side hinge part mounted to be rotatable in the bearing fork by a hinge axle,
   a U-shaped sliding part having two legs, supporting the bow-side hinge part, guided to be displaceable in a recess of a bow-side housing in the bow longitudinal direction, and receiving a coiled spring between the two legs, the coiled spring:
      being supported on one side on a web connecting the two legs of the U-shaped sliding part, and
      being supported on another side on a buttress, the buttress engaging through a through opening and in the bow-side hinge part in a nut thread of the housing, the through opening running coaxially to the coiled spring, and the nut thread being coaxial to the coiled spring,
   wherein the cheek-side hinge part forms an insert inserted into a laterally closed receptacle pocket of the bow cheek, and
   wherein the bow cheek exposes a passage for the buttress, the passage for the buttress being coaxial to the coiled spring, in an angled bow position.

2. The spring hinge according to claim 1, wherein the hinge axle is recessed in the area of the passage for the buttress.

3. The spring hinge according to claim 1, wherein the hinge axle comprises two axle stubs held at an axial distance from one another by the buttress.

* * * * *